US009578542B2

(12) United States Patent
Zhang et al.

(10) Patent No.: US 9,578,542 B2
(45) Date of Patent: Feb. 21, 2017

(54) METHOD AND CORE NETWORK DEVICE FOR TRANSMITTING DEVICE TRIGGER MESSAGE

(71) Applicant: HUAWEI DEVICE CO., LTD., Shenzhen (CN)

(72) Inventors: Jun Zhang, Beijing (CN); Hui Jin, Beijing (CN); Qiang Yi, Beijing (CN); Na Li, Shenzhen (CN)

(73) Assignee: HUAWEI DEVICE CO., LTD., Shenzhen (CN)

(*) Notice: Subject to any disclaimer, the term of this patent is extended or adjusted under 35 U.S.C. 154(b) by 177 days.

(21) Appl. No.: 14/583,989

(22) Filed: Dec. 29, 2014

(65) Prior Publication Data

US 2015/0117189 A1   Apr. 30, 2015

Related U.S. Application Data

(63) Continuation of application No. PCT/CN2013/086487, filed on Nov. 4, 2013.

(30) Foreign Application Priority Data

Nov. 5, 2012 (CN) .......................... 2012 1 0436243

(51) Int. Cl.
*H04W 28/02* (2009.01)
*H04W 4/00* (2009.01)
(Continued)

(52) U.S. Cl.
CPC ............ *H04W 28/0289* (2013.01); *H04L 1/00* (2013.01); *H04W 4/005* (2013.01); *H04W 4/20* (2013.01)

(58) Field of Classification Search
CPC .... H04W 28/0289; H04W 4/005; H04W 8/02; H04W 8/04; H04W 28/0215
See application file for complete search history.

(56) References Cited

U.S. PATENT DOCUMENTS

2010/0146117 A1   6/2010   Hoeksel
2012/0033551 A1   2/2012   Liao
(Continued)

FOREIGN PATENT DOCUMENTS

CN   102427604   4/2012
CN   102740400   10/2012
CN   103024810   4/2013

OTHER PUBLICATIONS

"SA WG2 Temporary Document"; Pope; created Oct. 24, 2012; retreived from the Internet on Aug. 18, 2016; http://isearch.3gpp.org/isysquery/ef12827a-a2e9-42b6-80d7-045f06f7579e/5/doc/.*
(Continued)

Primary Examiner — Benjamin H Elliott, IV
(74) Attorney, Agent, or Firm — Oblon, McClelland, Maier & Neustadt, L.L.P.

(57) ABSTRACT

In transmitting a device trigger message operation, a core network device receives a device trigger message sent by a first device, where the device trigger message includes information that indicates validity time of the device trigger message; when it is determined that a timer exists, compares the validity time with duration of the timer; if the validity time is greater than the duration of the timer, sends the device trigger message to a user equipment UE after the timer times out; and if the validity time is not greater than the duration of the timer, sends a message to the first device and/or discarding the device trigger message, where the message is used to indicate that triggering is rejected, or transmission fails, or device triggering fails.

14 Claims, 12 Drawing Sheets

(51) Int. Cl.
*H04W 4/20* (2009.01)
*H04L 1/00* (2006.01)

(56) References Cited

U.S. PATENT DOCUMENTS

| | | | |
|---|---|---|---|
| 2012/0257571 A1* | 10/2012 | Liao | H04W 4/005 370/328 |
| 2014/0011505 A1* | 1/2014 | Liao | H04W 68/025 455/450 |
| 2014/0220987 A1 | 8/2014 | Wu | |
| 2014/0269779 A1* | 9/2014 | Shan | H04W 28/24 370/509 |
| 2015/0111533 A1* | 4/2015 | Chandramouli | H04W 12/12 455/410 |
| 2015/0117189 A1* | 4/2015 | Zhang | H04L 1/00 370/230 |
| 2015/0181564 A1* | 6/2015 | Rao | H04W 24/04 370/329 |

OTHER PUBLICATIONS

S2-124307, "Update the solution of Overload Control for Device Triggering"; Huawei; Nov. 12, 2016; retreived from the Internet on Aug. 18, 2016.*

PCT International Search Report dated Feb. 6, 2014 in corresponding International Patent Application No. PCT/CN2013/086487.

"3rd Generation Partnership Project; Technical Specification Group Services and System Aspects; Architecture enhancements to facilitate communications with packet data networks and applications (Release 11)", 3GPP TS 23.682, V11.2.0, Sep. 2012, pp. 1-29.

"3rd Generation Partnership Project; Technical Specification Group Services and System Aspects; Machine-Type and other Mobile Data Applications Communications Enhancements (Release 12)", 3GPP TR 23.887, V0.3.0, Oct. 2012, pp. 1-52.

Extended European Search Report dated Jul. 7, 2015 in corresponding European Patent Application No. 13851362.7.

"3rd Generation Partnership Project; Technical Specification Group Services and System Aspects; System Improvements for Machine-Type Communications (Release 11)", 3GPP TR 23.888, V1.6.1, Feb. 2012, pp. 1-165.

"3rd Generation Partnership Project; Technical Specification Group Core Network and Terminals; Tsp interface protocol between the MTC Interworking Function (MTC-IWF) and Service Capability Server (SCS) (Release 11)", 3GPP TS 29.368, V2.0.0, Sep. 2012, pp. 1-23.

International Search Report mailed Feb. 6, 2014 in corresponding International Patent Application No. PCT/CN2013/086487 (2 pages) (2 pages English Translation).

* cited by examiner

METHOD AND CORE NETWORK DEVICE FOR TRANSMITTING DEVICE TRIGGER MESSAGE

CROSS-REFERENCE TO RELATED APPLICATIONS

This application is a continuation of International Application No. PCT/CN 2013/086487, filed on Nov. 4, 2013, which claims priority to Chinese Patent Application No. 201210436243.0, filed on Nov. 5, 2012, both of which are hereby incorporated by reference in their entireties

TECHNICAL FIELD

Embodiments of the present invention relate to the field of electronics and information technologies, and in particular, to a method and a core network device for transmitting a device trigger message.

BACKGROUND

The M2M (Machine-to-Machine, machine-to-machine) communications technology can implement information transmission, collaboration, and processing between machines, between a machine and a person, and between a machine and another device, by using existing network hardware facilities. In addition, the technology is widely applied to application scenarios such as logistics management, electricity meter reading, and health supervision, thereby enhancing system and personnel working efficiency and reducing manpower costs.

In practical application, generally, an MTC (Machine Type Communications, machine type communications) device needs to be triggered to enable application of the M2M technology in a 3GPP system, and a specific triggering process needs to be performed by using an interface such as T4 and T5. However, if network congestion or overload occurs during the process of triggering the device by using the interface, a network element device such as an SGSN/MME (Serving GPRS Support Node/Mobility Management Entity, Serving GPRS Support Node/Mobility Management Entity) may not effectively send a trigger message to the MTC device.

In order to resolve a triggering overload problem, the prior art provides a triggering overload control solution:

When a network is congested or overloaded, a UE (User Equipment, user equipment), which serves as a triggered end, receives feedback information that includes a back-off timer (back-off timer), and the UE does not send request signaling before the back-off timer times out. In addition, a machine type communications interworking device MTC-IWF, which serves as a triggering end, also receives a message (for example, a transmission result message, a device trigger result message, or a message that is the same as the feedback information received by the UE) that carries a trigger-suppression timer, and the MTC-IWF does not re-send a trigger request before the trigger-suppression timer times out.

However, in many cases, the trigger message has a validity time for triggering, and the trigger message becomes invalid when the validity time expires. For example, the SGSN/MME sends the message that carries the trigger-suppression timer to the MTC-IWF. However, duration of the trigger-suppression timer may be longer than the validity time of the trigger message. When the timer times out, the trigger message has become invalid, so that a trigger message needs to be re-transmitted. This increases information load of a network and further reduces operating efficiency of the network when the network is already congested or overloaded. In addition, transmission of the invalid trigger message is equivalent to adding junk information to the network, which increases the information load of the network that is already congested or overloaded, and further reduces the operating efficiency of the network.

SUMMARY

Embodiments of the present invention provide a method and a core network device for transmitting a device trigger message. By comparing validity time of a trigger message with duration of a timer, the embodiments of the present invention can prevent an invalid trigger message from being transmitted to a network, so as to reduce network load and enhance operating efficiency of the network.

To achieve the foregoing objective, the following technical solutions are adopted in the embodiments of the present invention:

According to a first aspect, an embodiment of the present invention provides a method for transmitting a device trigger message, and the method includes:

receiving a device trigger message sent by a first device, where the device trigger message includes information that indicates validity time of the device trigger message;

when it is determined that a timer exists, comparing the validity time with duration of the timer;

if the validity time is greater than the duration of the timer, sending the device trigger message to a user equipment UE after the timer times out; and if the validity time is not greater than the duration of the timer, sending a message to the first device and/or discarding the device trigger message, where the message is used to indicate that triggering is rejected, or transmission fails, or device triggering fails.

Optionally, the receiving, a device trigger message sent by a first device includes: receiving, by a short message service-service center SMS-SC, the device trigger message that is sent by a machine type communications interworking device MTC-IWF and is from a service capability server SCS.

The comparing the validity time with duration of the timer includes: comparing, by the SMS-SC, the validity time with the duration of the timer.

Optionally in parallel, the receiving a device trigger message sent by a first device includes: receiving, by a serving node, the device trigger message that is sent by an SMS-SC and is from the SCS, where the device trigger message is sent by the SCS to the SMS-SC by using an MTC-IWF, and is then sent by the SMS-SC to the serving node.

The comparing the validity time with duration of the timer includes: comparing, by the serving node, the validity time with the duration of the timer.

Optionally in parallel, the receiving a device trigger message sent by a first device includes: receiving, by an MTC-IWF, the device trigger message sent by the SCS.

The comparing the validity time with duration of the timer includes: comparing, by the MTC-IWF, the validity time with the duration of the timer.

Optionally in parallel, the receiving a device trigger message sent by a first device includes: receiving, by a serving node, the device trigger message that is sent by an MTC-IWF and is from the SCS.

The first device includes the SCS or the MTC-IWF.

According to a second aspect, an embodiment of the present invention provides a core network device for transmitting a device trigger message, and the device includes:

a receiver, configured to receive a device trigger message sent by a first device, where the device trigger message includes information that indicates validity time of the device trigger message;

a processor, configured to, when it is determined that a timer exists, compare the validity time with duration of the timer; and a transmitter, configured to, if the validity time is greater than the duration of the timer, send the device trigger message to a user equipment UE after the timer times out, where the transmitter is further configured to, if the validity time is not greater than the duration of the timer, send a message to the first device and/or discard the device trigger message, where the message is used to indicate that triggering is rejected, or transmission fails, or device triggering fails.

Optionally, the core network device is a short message service-service center SMS-SC, and the receiver is further configured to receive the device trigger message that is sent by a machine type communications interworking device MTC-IWF and is from a service capability server SCS.

Optionally in parallel, the core network device is a serving node, and the receiver is further configured to receive the device trigger message that is sent by an SMS-SC and is from the SCS, where the device trigger message is sent by the SCS to the SMS-SC by using an MTC-IWF, and is then sent by the SMS-SC to the serving node.

The receiver is further configured to receive the device trigger message that is sent by the MTC-IWF and is from the SCS.

Optionally in parallel, the core network device is an MTC-IWF, and the receiver is further configured to receive the device trigger message sent by the SCS.

According to a method and a core network device for transmitting a device trigger message that are provided in embodiments of the present invention, a device trigger message that times out can be filtered out by comparing validity time of the device trigger message with duration of a timer that operates when overload control or congestion control is performed on a network, thereby preventing the device trigger message whose validity time expires from being transmitted to the network, so as to reduce network load and enhance operating efficiency of the network. In addition, a device on the network can be stopped from sending the device trigger message to the network before the timer times out, so as to reduce the network load and enhance the operating efficiency of the network in a time period when the overload control or the congestion control is performed on the network because the network load is relatively large.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make the advantages of the technical solutions of the present invention clearer, the following describes the present invention in detail with reference to the accompanying drawings and embodiments.

Figure 1A:
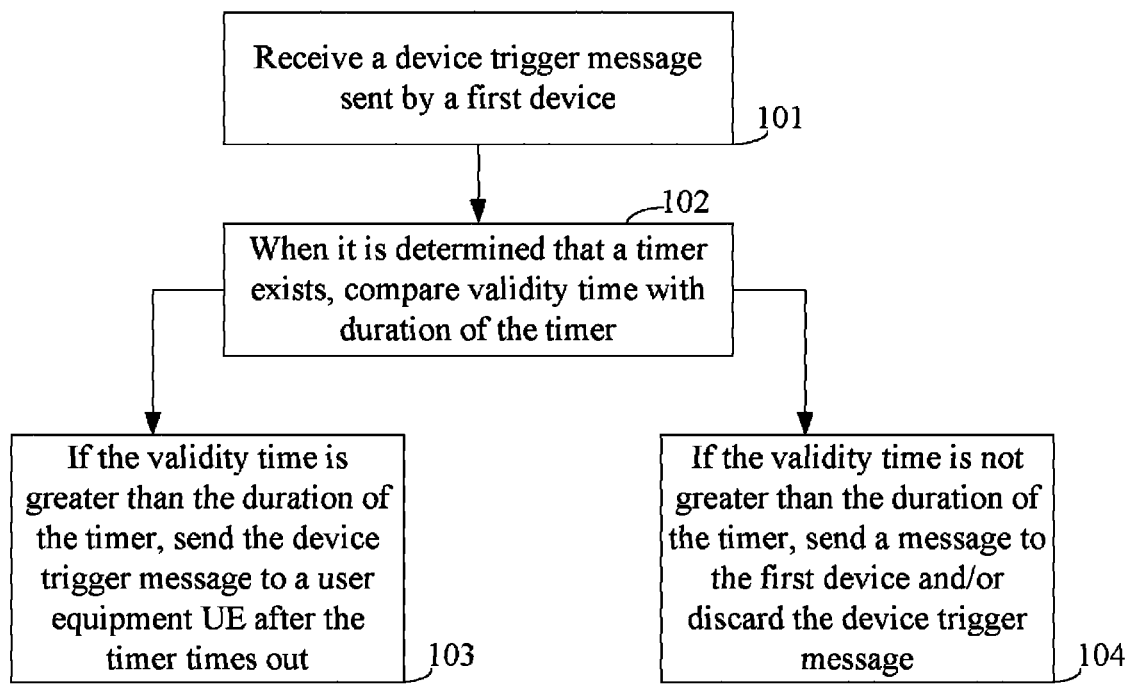
FIG. 1a is a flowchart of a method for transmitting a device trigger message according to an embodiment of the present invention.

According to one aspect, as shown in FIG. 1a, a method for transmitting a device trigger message is provided in an embodiment of the present invention, where the method includes:

101. Receive a device trigger message sent by a first device.

The device trigger message includes information that indicates validity time of the device trigger message. For example, for a device trigger message that has validity time and is well-known to a person skilled in the art, a device that transmits the device trigger message in a core network may transmit the device trigger message for multiple times within the validity time, that is, the core network device does not perform only a one-off transmission attempt on the device trigger message.

Further, in this embodiment, the first device may include an SCS (Service Capability Server, service capability server) and may also include another device that can transmit the device trigger message to a network, such as an SMS-SC (Short Message Service-SC, short message service-service center) or an MTC-IWF (Machine Type Communications-Inter-working Function, machine type communications interworking device).

Figure 1B:
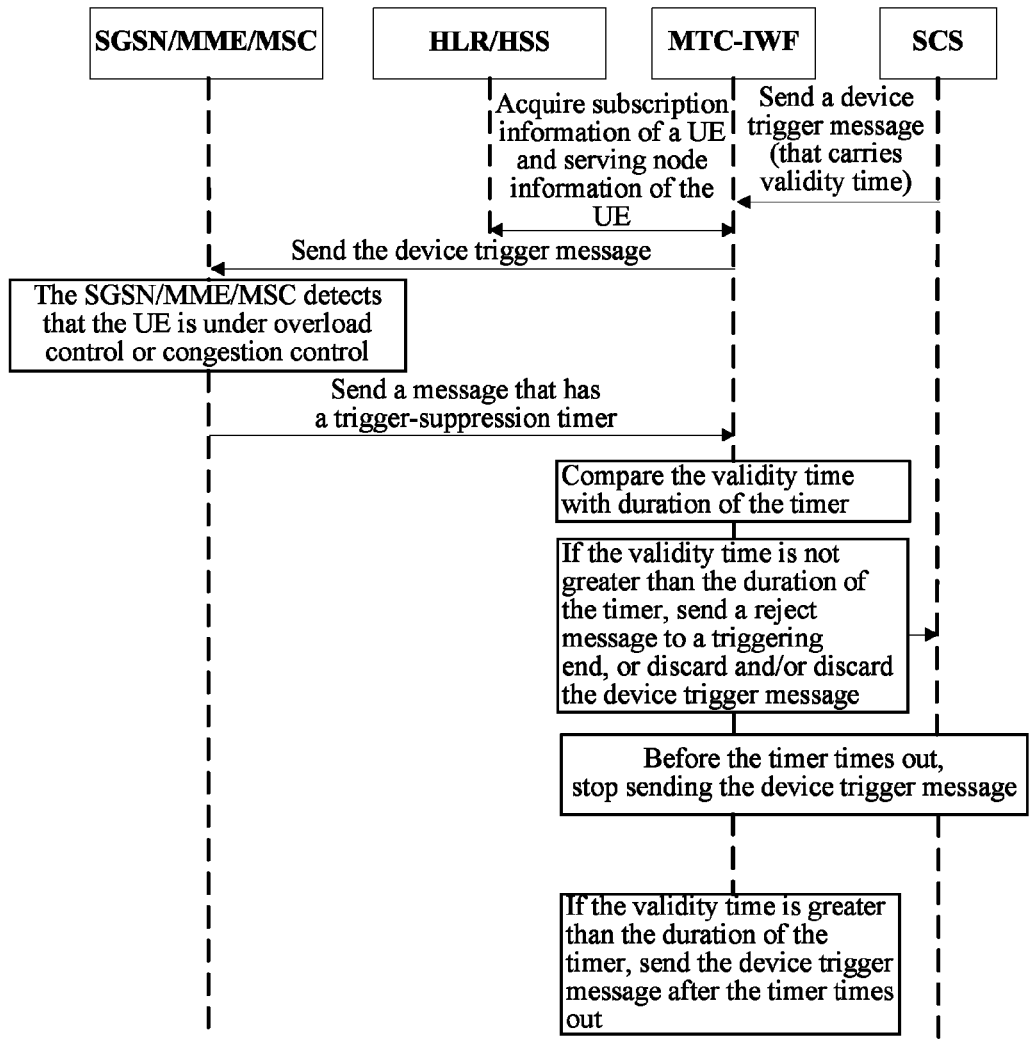
FIG. 1b is an information exchange schematic diagram of a specific instance according to an embodiment of the present invention.

As shown in FIG. 1b, the SCS that serves as the first device may send a device trigger message that carries validity time information to the MTC-IWF.

Alternatively, in practical application, the MTC-IWF may send or re-transmit the device trigger message sent by the SCS; therefore, in an application scenario involved in this embodiment, the MTC-IWF may also serve as the first device.

It should be noted that, in this embodiment, the device trigger message sent by the first device may be a message that includes only a string used to trigger a device, and a part of the message is used to indicate the validity time; the device trigger message may also be a message that includes the validity time and a string that is used to trigger a device; and the message may further include a string that has another function in addition to the validity time and the string that is used to trigger a device.

102. When it is determined that a timer exists, compare the validity time with duration of the timer.

In this embodiment, when it is determined that the timer exists, a network element (such as an SGSN/MME/MSC, the SMS-SC, or the MTC-IWF) in the core network compares the validity time with the duration of the timer.

For example, as shown in FIG. 1b, when it is determined that the timer exists, the MTC-IWF compares the validity time with the duration of the timer, so as to determine whether the validity time of the device trigger message is greater than the duration of the timer. The timer includes but is not limited to a trigger-suppression timer or a back-off timer, and may also be another type of timer that is well-known to a person skilled in the art. The timer that is compared with the validity time by the core network device may be a trigger-suppression timer generated by the SGSN/MME/MSC; for example, after receiving the device trigger message sent by the SCS, the MTC-IWF may first query, in an HLR/HSS (Home Location Register/Home Subscriber Server, home location register/home subscriber server), subscription information of a UE and serving node information of the UE, and then send the device trigger message to the SGSN/MME/MSC in which the UE is located, where the device trigger message carries the validity time information, so that the SGSN/MME/MSC detects whether the UE is under overload control or congestion control.

When the network is congested or overloaded, the SGSN/MME/MSC may perform the congestion control. After receiving the device trigger message sent to the user equipment, the SGSN/MME/MSC may reject a request sent by the MTC-IWF for triggering the user equipment, and carry, in a feedback message, a string that indicates a reason why the triggering is rejected or fails and a trigger-suppression timer, and the MTC-IWF compares the validity time of the device trigger message with duration of the trigger-suppression timer. That is, in this embodiment, a timer that participates in comparison with the validity time may be a timer generated by the SGSN/MME/MSC, such as a trigger-suppression timer received by the MTC-IWF.

103. If the validity time is greater than the duration of the timer, send the device trigger message to a user equipment UE after the timer times out.

In this embodiment, a device that can receive the device trigger message includes but is not limited to the UE. The device may be a UE that performs data interaction with the core network, and may also be another specific device or specific apparatus that can access the core network, such as a base station or a mobile server. The another specific device or specific apparatus may receive, by using the device in the core network, the trigger message, and trigger, according to the received trigger message, a corresponding specific action such as analysis, calculation, and a business process.

For example, as shown in FIG. 1b, if the validity time is greater than the duration of the timer, the MTC-IWF in the core network may, after the timer times out, use a standard triggering process that is well-known to a person skilled in the art to re-send the device trigger message.

104. If the validity time is not greater than the duration of the timer, send a message to the first device and/or discard the device trigger message.

The message sent in the step 104 is used to indicate that triggering is rejected, or transmission fails, or device triggering fails. For example, as shown in FIG. 1b, if the validity time is not greater than the duration of the timer, the SGSN/MME/MSC in the core network may send a reject message to the first device and/or discard the device trigger message.

In this embodiment, the reject message may be a string that is well-known to a person skilled in the art and is used to indicate a transmission result or a device triggering result, and the string that is used to indicate a transmission result or a device triggering result may be carried in another message, so that the message, which carries the string that is used to indicate a transmission result or a device triggering result, may be used as the reject message; or the string that is used to indicate a transmission result or a device triggering result may be separately encapsulated into an independent message by using a common technical means, so that the message, which is encapsulated according to the string that is used to indicate a transmission result or a device triggering result, may also be used as the reject message.

It should be noted that the foregoing steps 101 to 104 are executed by the core network device. The core network device includes: the SMS-SC, the MTC-IWF, or the SGSN/MME/MSC (Serving GPRS Support Node/Mobility Management Entity/Mobile Switching Center, Serving GPRS Support Node/Mobility Management Entity/Mobile Switching Center) or the like, where the SGSN/MME/MSC is referred to as a serving node in this embodiment of the present invention.

Further, if the validity time is not greater than the duration of the timer, the core network device may further select and perform another standard triggering process that is different from a current triggering process.

Still further, the reject message may further include a timer. For example, as well-known to a person skilled in the art, because the device trigger message is used to trigger a UE, the first device stops sending the device trigger message to the core network device before the timer in the reject message times out, so that the trigger message is no longer sent to the UE by using the core network device (or the first device stops sending the device trigger message that triggers the UE). For example, as shown in FIG. 1b, after the SGSN/MME/MSC in the core network sends the reject message to the MTC-IWF, the MTC-IWF may then send the reject message to the SCS; because the reject message further includes a timer such as a trigger-suppression timer, the SCS or the MTC-IWF stops sending the device trigger message before the timer in the reject message times out.

This avoids a situation that the device trigger message is re-sent to a network in a time period when the overload control or the congestion control is performed on the network because network load is relatively large, thereby reducing the network load and enhancing operating efficiency of the network.

Figure 2A:
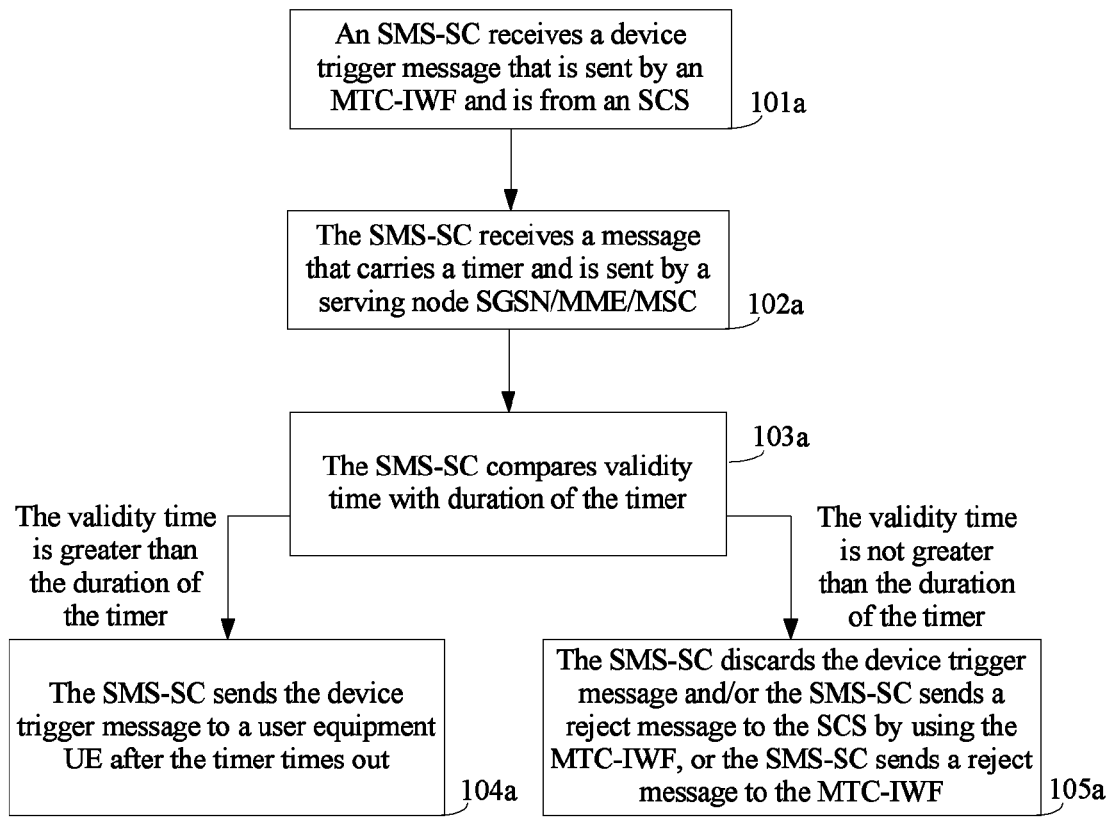
FIG. 2a is a flowchart of another method for transmitting a device trigger message according to an embodiment of the present invention.

Optionally, as shown in FIG. 2a, a method for transmitting a device trigger message is further provided in an embodiment of the present invention, where the method includes:

101a. An SMS-SC receives the device trigger message that is sent by an MTC-IWF and is from an SCS.

Figure 2B:
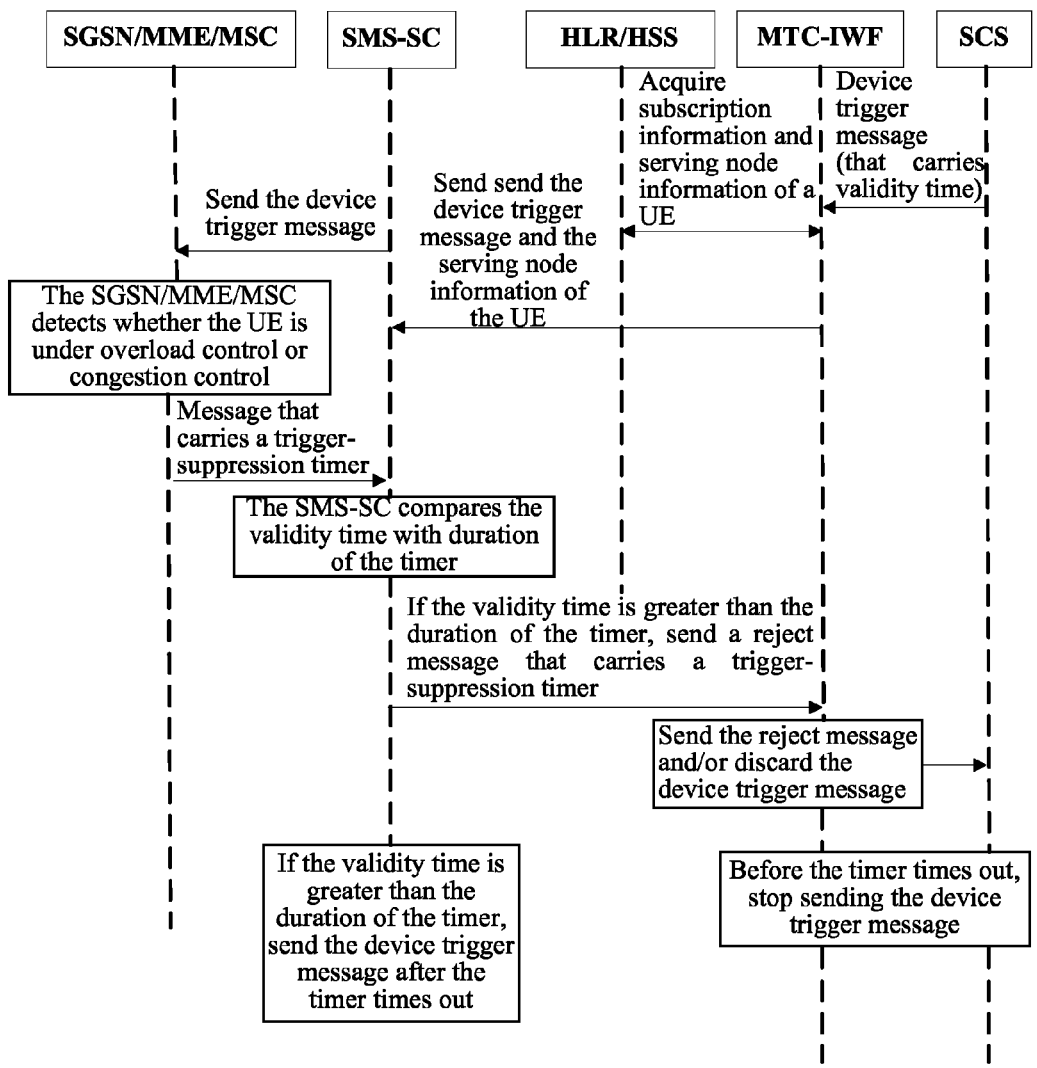
FIG. 2b is an information exchange schematic diagram of another specific instance according to an embodiment of the present invention.

For example, as shown in FIG. 2b, the device trigger message may be first sent by the SCS to the MTC-IWF, and then be sent by the MTC-IWF to the SMS-SC. In addition, after receiving the device trigger message sent by the SCS, the MTC-IWF may first query subscription information of an UE and serving node information of the UE in an HLR/HSS, and then send the serving node information of the UE and the device trigger message to the SMS-SC, where the device trigger message carries validity time information. Afterward, the SMS-SC may send, according to the serving node information, the device trigger message to a serving node SGSN/MME/MSC in which the UE is located, so that the serving node SGSN/MME/MSC detects whether the UE is under overload control or congestion control.

102a. The SMS-SC receives a message that carries the timer and is sent by a serving node SGSN/MME/MSC.

When it is detected that the UE is under the overload control or the congestion control, the message that carries the timer is sent by the serving node SGSN/MME/MSC to the SMS-SC.

In this embodiment, another network element in a core network may detect, by using the serving node SGSN/MME/MSC, whether the UE is under the overload control or the congestion control. For example:

As shown in FIG. 2b, the serving node SGSN/MME/MSC may detect, by using a common technical means, whether the UE is under the overload control or the congestion control. For example, in a scenario where the MTC-IWF may send or re-transmit the device trigger message sent by the SCS, the MTC-IWF may, after receiving the device trigger message sent by the SCS, query the subscription information of the UE and the serving node information of the UE in the HLR/HSS (Home Location Register/Home Subscriber Server, home location register/home subscriber server), and send the device trigger message to the SGSN/MME/MSC by using the SMS-SC, so that the SGSN/MME/MSC detects whether the UE is under the overload control or the congestion control. If the UE is under the overload control or the congestion control, the SGSN/MME/MSC generates a trigger-suppression timer and adds the trigger-suppression timer into a message that the SGSN/MME/MSC sends to the SMS-SC, so that the SMS-SC determines that a timer exists in the message sent by the serving node SGSN/MME/MSC.

If the UE is not under the overload control or the congestion control, no processing is performed.

103a. The SMS-SC compares the validity time with duration of the timer.

104a. If the validity time is greater than the duration of the timer, the SMS-SC sends the device trigger message to a user equipment UE after the timer times out.

Specifically, in this embodiment, as shown in FIG. 2b, if the validity time is greater than the duration of the timer, the SMS-SC may send the device trigger message to the UE after the timer times out.

105a. If the validity time is not greater than the duration of the timer, the SMS-SC discards the device trigger message and/or the SMS-SC sends the reject message to the SCS by using the MTC-IWF, or the SMS-SC sends the reject message to the MTC-IWF.

In this embodiment, as shown in FIG. 2b, the SMS-SC needs to first send the reject message to the MTC-IWF, and then the MTC-IWF may send the reject message to the SCS. In this embodiment, the reject message may be a transmission result message or a device triggering result message used to indicate that triggering is rejected or fails, may be a string that is well-known to a person skilled in the art and is used to indicate that triggering is rejected or fails, or may be a string that is used to indicate a device triggering result. In addition, either the string that is used to indicate that triggering is rejected or fails or the string that is used to indicate the device triggering result may be encapsulated into a message that is to be sent by the SMS-SC to the MTC-IWF. That is, a message sent by the SMS-SC to the MTC-IWF and including the string that is used to indicate that triggering is rejected or fails is a reject message.

Further, in this embodiment, the validity time of the device trigger message is not greater than the duration of the timer; therefore, after the timer times out, the device trigger message becomes an invalid message or junk information because the validity time expires. Therefore, the SMS-SC may also directly discard the device trigger message, thereby preventing the device trigger message whose validity time expires from being transmitted to a network, so as to reduce network load and enhance operating efficiency of the network.

Still further, the reject message may further include a timer, so that the SCS or the MTC-IWF stops sending the device trigger message before the timer in the reject message times out. This avoids a situation that a first device sends the device trigger message to the network in a time period when the overload control or the congestion control is performed on the network because the network load is relatively large, thereby reducing the network load and enhancing the operating efficiency of the network.

Figure 3A:
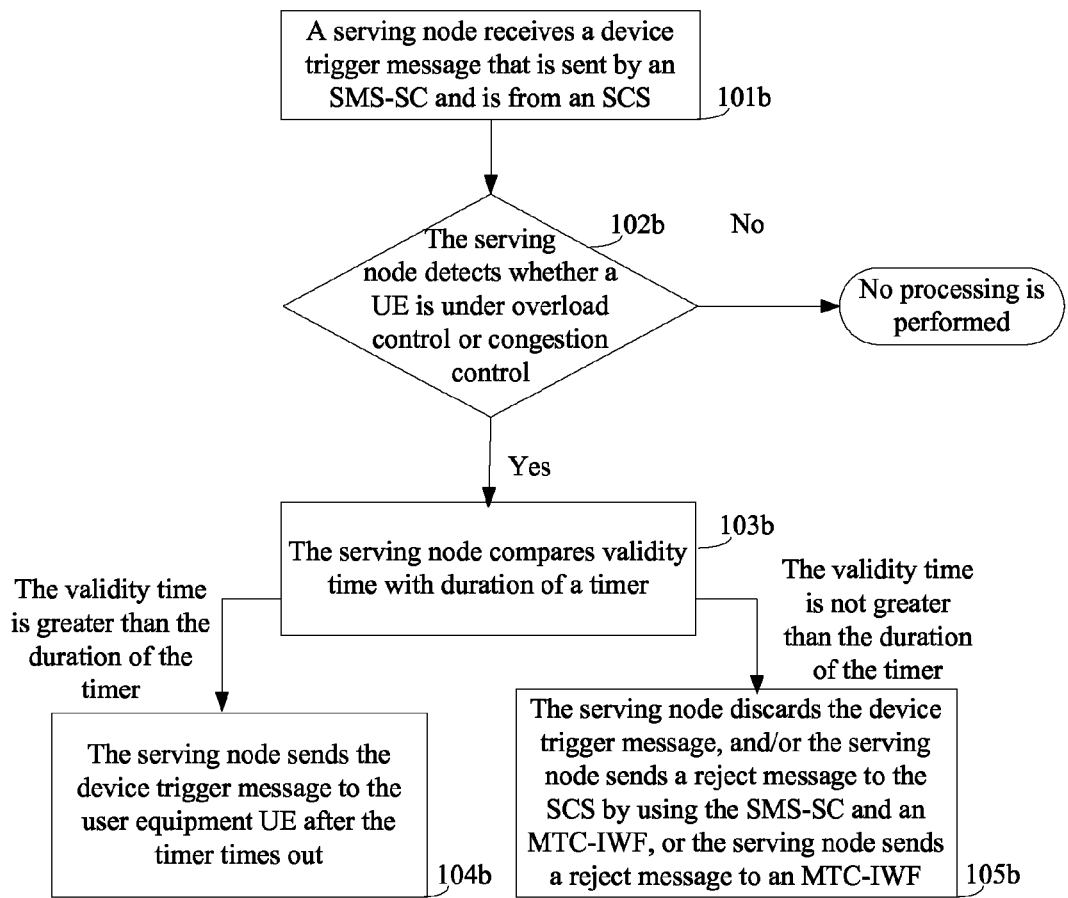
FIG. 3a is a flowchart of still another method for transmitting a device trigger message according to an embodiment of the present invention.

Optionally in parallel, as shown in FIG. 3a, another method for transmitting a device trigger message is further provided in an embodiment of the present invention, where the method includes:

101b. An SGSN/MME/MSC receives the device trigger message that is sent by an SMS-SC and is from the SCS.

The device trigger message is sent by the SCS to the SMS-SC by using an MTC-IWF, and is then sent by the SMS-SC to the SGSN/MME/MSC.

Figure 3B:
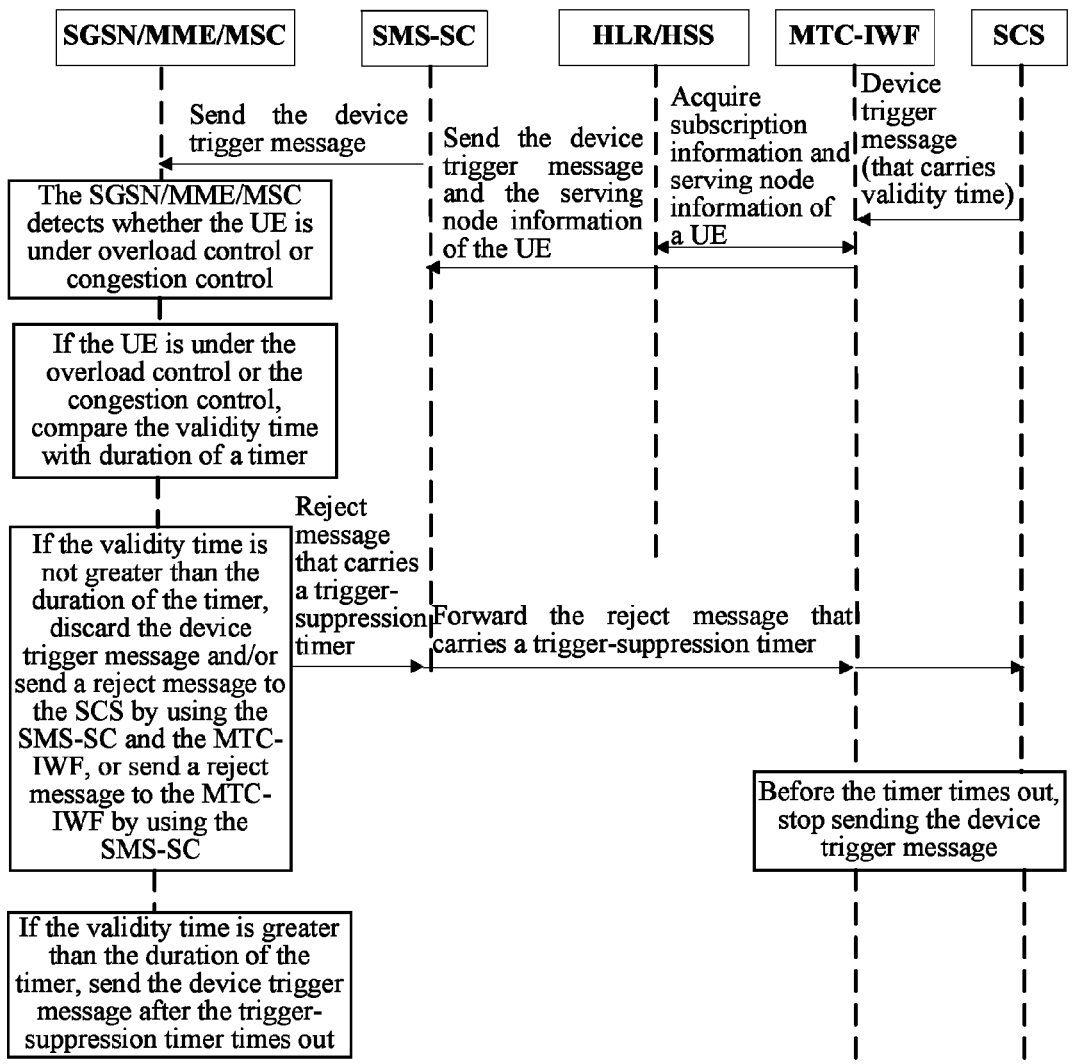
FIG. 3b is an information exchange schematic diagram of still another specific instance according to an embodiment of the present invention.

For example, as shown in FIG. 3b, the device trigger message may be first sent by the SCS to the MTC-IWF, and then be sent by the MTC-IWF to the SMS-SC. In addition, after receiving the device trigger message sent by the SCS, the MTC-IWF may first query subscription information of a UE and serving node information of the UE in an HLR/HSS, and then send the serving node information of the UE and the device trigger message to the SMS-SC, where the device trigger message carries validity time information. Afterward, the SMS-SC may send, according to the serving node information, the device trigger message to the serving node SGSN/MME/MSC in which the UE is located.

102b. The SGSN/MME/MSC detects whether a UE is under overload control or congestion control.

For example, as shown in FIG. 3b, in a scenario where the MTC-IWF may send or re-transmit the device trigger message sent by the SCS, the MTC-IWF may, after receiving the device trigger message sent by the SCS, query the subscription information of the UE and the serving node information of the UE in the HLR/HSS, and send the device trigger message to the SGSN/MME/MSC by using the SMS-SC, so that the SGSN/MME/MSC detects whether the UE is under the overload control or the congestion control. If the UE is under the overload control or the congestion control, the SGSN/MME/MSC generates a trigger-suppression timer.

If the UE is not under the overload control or the congestion control, no processing is performed.

103b. If the UE is under the overload control or the congestion control, the SGSN/MME/MSC compares the validity time with duration of the timer.

For example, as shown in FIG. 3b, after generating the trigger-suppression timer, the SGSN/MME/MSC may compare the validity time with the duration of the timer.

104b. If the validity time is greater than the duration of the timer, the SGSN/MME/MSC sends the device trigger message to the user equipment UE after the timer times out.

Specifically, in this embodiment, as shown in FIG. 3b, if the validity time is greater than the duration of the timer, the SGSN/MME/MSC may send the device trigger message to the UE after the timer times out.

105b. If the validity time is not greater than the duration of the timer, the SGSN/MME/MSC discards the device trigger message, and/or the SGSN/MME/MSC sends the reject message to the SCS by using the SMS-SC and the MTC-IWF, or the SGSN/MME/MSC sends the reject message to the MTC-IWF.

The reject message is sent by the SGSN/MME/MSC to the SMS-SC, and is then transmitted by the SMS-SC to the SCS by using the MTC-IWF.

In this embodiment, as shown in FIG. 3b, the SGSN/MME/MSC needs to first send the reject message to the SMS-SC, and then the SMS-SC sends the reject message to the MTC-IWF or the SCS. The reject message may include: a transmission result message that is used to indicate that triggering is rejected or fails, or a device triggering result message.

Further, in this embodiment, the validity time of the device trigger message is not greater than duration of the timer; therefore, after the timer times out, the device trigger message becomes an invalid message or junk information because the validity time expires. Therefore, the SGSN/MME/MSC may also directly discard the device trigger message, thereby preventing the device trigger message whose validity time expires from being transmitted to a network, so as to reduce network load and enhance operating efficiency of the network.

Still further, as shown in FIG. 3b, the reject message may further include a timer, so that the SCS or the MTC-IWF stops sending the device trigger message before the timer in the reject message times out. This avoids a situation that a first device sends the device trigger message to the network in a time period when the overload control or the congestion control is performed on the network because the network load is relatively large, thereby reducing the network load and enhancing the operating efficiency of the network.

Figure 4A:
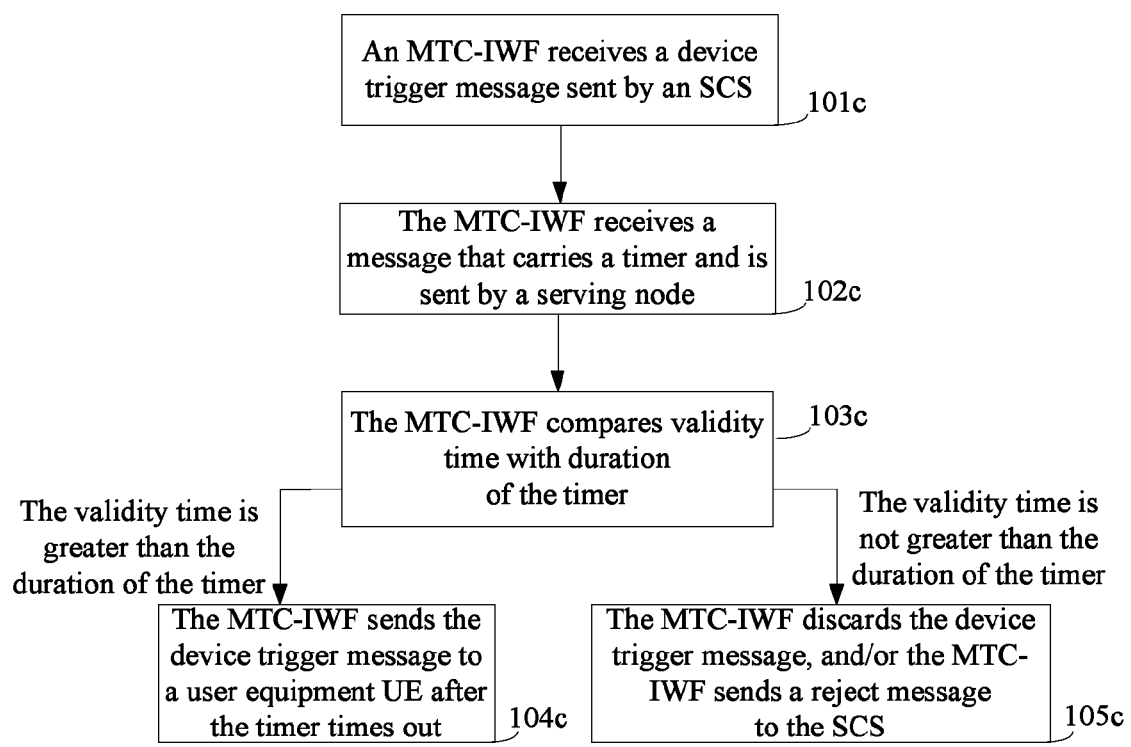
FIG. 4a is a flowchart of yet another method for transmitting a device trigger message according to an embodiment of the present invention.

Optionally in parallel, as shown in FIG. 4a, still another method for transmitting a device trigger message is further provided in an embodiment of the present invention, where the method includes:

101c. An MTC-IWF receives the device trigger message sent by the SCS.

Figure 4B:
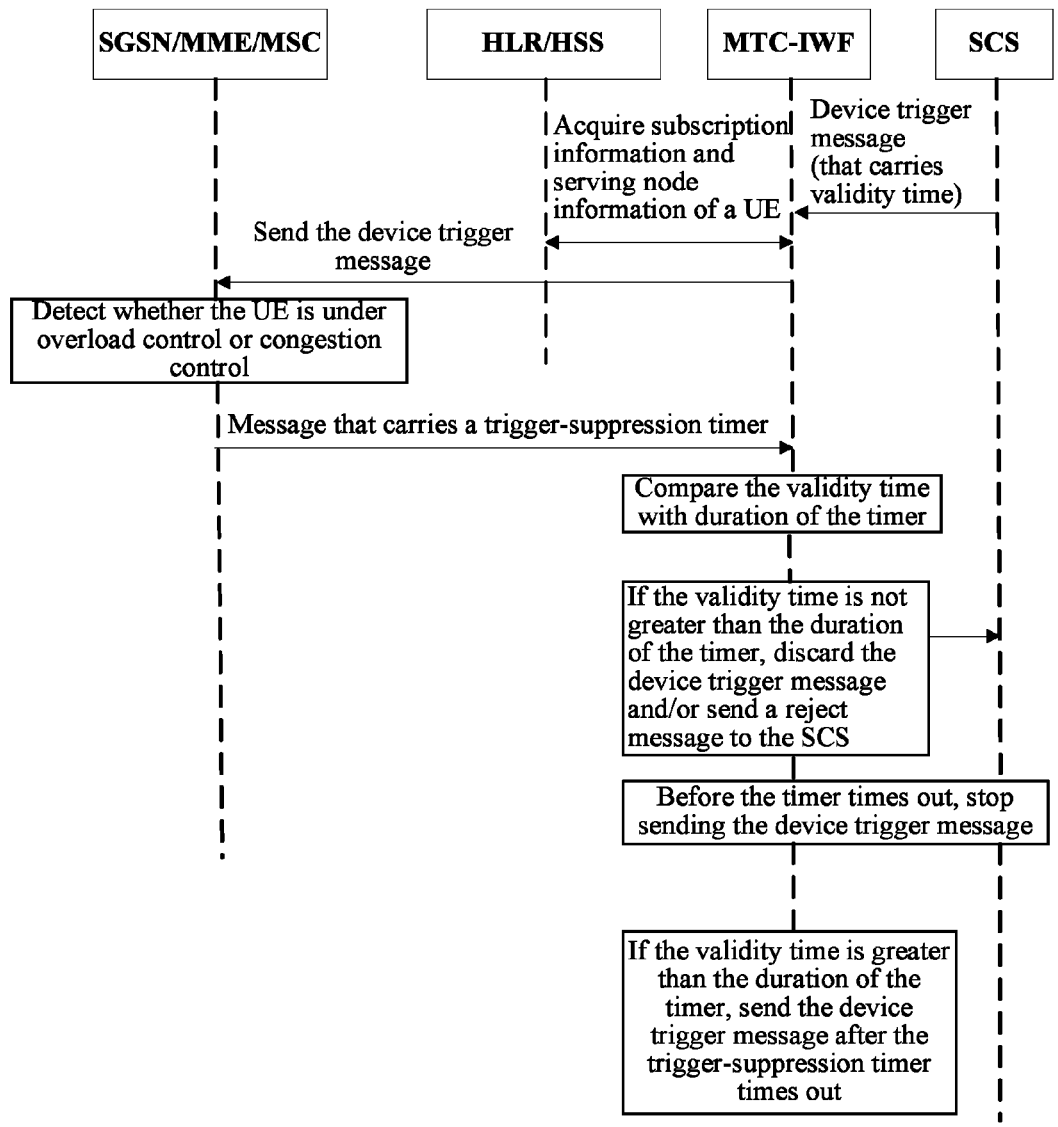
FIG. 4b is an information exchange schematic diagram of yet another specific instance according to an embodiment of the present invention.

For example, as shown in FIG. 4b, after receiving the device trigger message sent by the SCS, the MTC-IWF may first query subscription information of a UE and serving node information of the UE in an HLR/HSS, and then send the device trigger message to a serving node SGSN/MME/MSC.

102c. The MTC-IWF receives a message that carries the timer and is sent by a serving node.

When it is detected that the UE is under overload control or congestion control, the message that carries the timer is sent by the serving node to the MTC-IWF.

For example, as shown in FIG. 4b, after the MTC-IWF sends the device trigger message to the serving node SGSN/MME/MSC, the SGSN/MME/MSC may detect whether the UE is under the overload control or the congestion control. If the UE is under the overload control or the congestion control, the SGSN/MME/MSC generates a trigger-suppression timer.

If the UE is not under the overload control or the congestion control, no processing is performed.

103c. The MTC-IWF compares the validity time with duration of the timer.

104c. If the validity time is greater than the duration of the timer, the MTC-IWF sends the device trigger message to a UE after the timer times out.

Specifically, in this embodiment, as shown in FIG. 4b, if the validity time is greater than the duration of the timer, the MTC-IWF may send the device trigger message to the UE after the timer times out.

105c. If the validity time is not greater than the duration of the timer, the MTC-IWF discards the device trigger message, and/or the MTC-IWF sends the reject message to the SCS, so that the SCS or the MTC-IWF stops sending the device trigger message before the timer in the reject message times out.

Further, in this embodiment, the validity time of the device trigger message is not greater than the duration of the timer; therefore, after the timer times out, the device trigger message becomes an invalid message or junk information because the validity time expires. Therefore, the MTC-IWF may also directly discard the device trigger message, thereby preventing the device trigger message whose validity time expires from being transmitted to a network, so as to reduce network load and enhance operating efficiency of the network.

Still further, as shown in FIG. 4b, the reject message may further include a timer, so that the SCS or the MTC-IWF stops sending the device trigger message before the timer in the reject message times out. This avoids a situation that a first device sends the device trigger message to the network in a time period when the overload control or the congestion control is performed on the network because the network load is relatively large, thereby reducing the network load and enhancing the operating efficiency of the network.

Figure 5A:
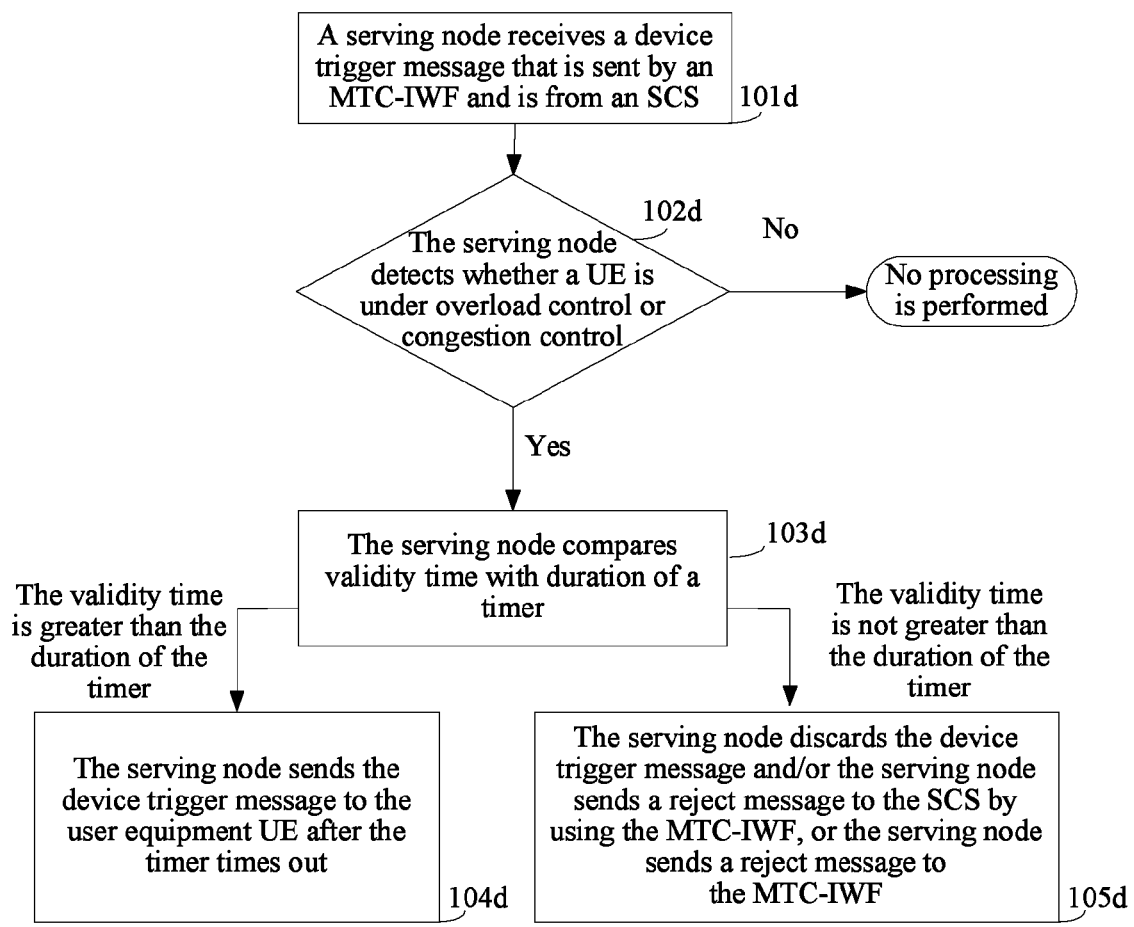
FIG. 5a is a flowchart of yet another method for transmitting a device trigger message according to an embodiment of the present invention.

Optionally in parallel, as shown in FIG. 5a, yet another method for transmitting a device trigger message is further provided in an embodiment of the present invention, where the method includes:

101d. An SGSN/MME/MSC receives the device trigger message that is sent by an MTC-IWF and is from the SCS.

The device trigger message may be sent by the SCS to the MTC-IWF, and then be sent by the MTC-IWF to the serving node.

Figure 5B:
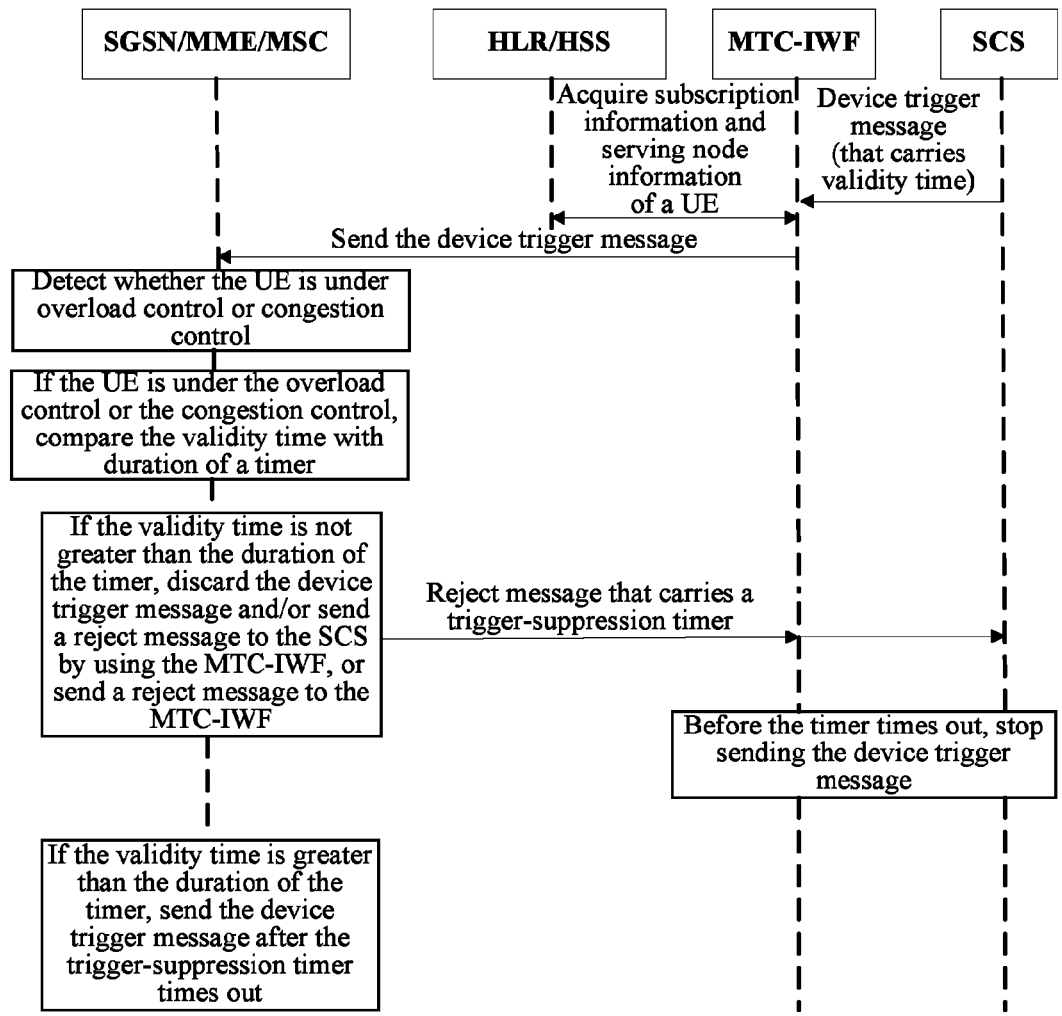
FIG. 5b is an information exchange schematic diagram of yet another specific instance according to an embodiment of the present invention.

For example, as shown in FIG. 5b, the device trigger message may be sent by the SCS to the MTC-IWF, and then be sent by the MTC-IWF to the SGSN/MME/MSC. In addition, after receiving the device trigger message sent by the SCS, the MTC-IWF may first query subscription information of a UE and serving node information of the UE in an HLR/HSS, and then send the subscription information of the UE, the serving node information of the UE, and the device trigger message to the SGSN/MME/MSC.

102d. The SGSN/MME/MSC detects whether a UE is under overload control or congestion control.

If the UE is not under the overload control or the congestion control, no processing is performed.

103d. If the UE is under the overload control or the congestion control, the serving node compares the validity time with duration of the timer.

For example, as shown in FIG. 5b, after generating a trigger-suppression timer, the SGSN/MME/MSC may compare the validity time with the duration of the timer.

104d. If the validity time is greater than the duration of the timer, the SGSN/MME/MSC sends the device trigger message to the UE after the timer times out.

Specifically, in this embodiment, as shown in FIG. 5b, if the validity time is greater than the duration of the timer, the SGSN/MME/MSC may send the device trigger message to the UE after the timer times out.

105d. If the validity time is not greater than the duration of the timer, the SGSN/MME/MSC discards the device trigger message, and/or the SGSN/MME/MSC sends the reject message to the SCS by using the MTC-IWF, or the SGSN/MME/MSC sends the reject message to the MTC-IWF.

Therefore, the SCS or the MTC-IWF stops sending the device trigger message before the timer in the reject message times out.

In this embodiment, as shown in FIG. 5b, the SGSN/MME/MSC may send the reject message to the MTC-IWF or the SCS.

Further, in this embodiment, the validity time of the device trigger message is not greater than the duration of the timer; therefore, after the timer times out, the device trigger message becomes an invalid message or junk information because the validity time expires. Therefore, the SGSN/MME/MSC may also directly discard the device trigger message, thereby preventing the device trigger message whose validity time expires from being transmitted to a network, so as to reduce network load and enhance operating efficiency of the network.

Still further, as shown in FIG. 5b, the reject message may further include a timer, so that the SCS or the MTC-IWF stops sending the device trigger message before the timer in the reject message times out. This avoids a situation that a first device sends the device trigger message to the network in a time period when the overload control or the congestion control is performed on the network because the network load is relatively large, thereby reducing the network load and enhancing the operating efficiency of the network.

Figure 6:
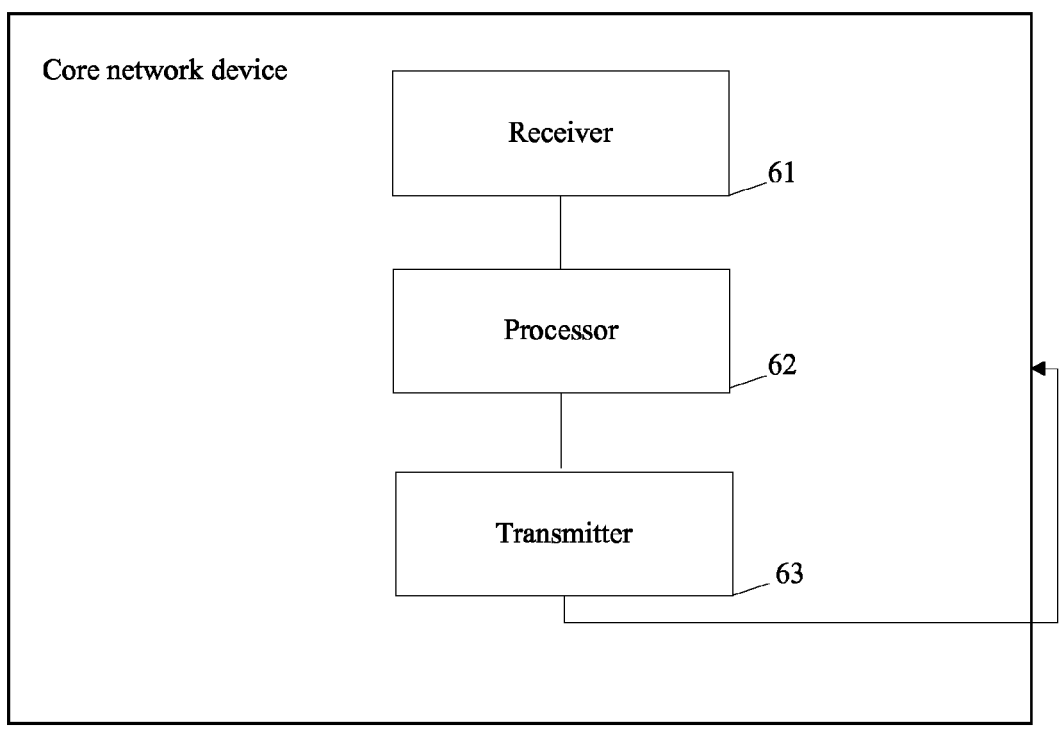
FIG. 6 is a schematic structural diagram of a core network device for transmitting a device trigger message according to an embodiment of the present invention.

According to another aspect, as shown in FIG. 6, a core network device for transmitting a device trigger message is provided in an embodiment of the present invention, where the core network device includes:

a receiver 61, configured to receive a device trigger message sent by a first device, where the device trigger message includes information that indicates validity time of the device trigger message;

a processor 62, configured to, when it is determined that a timer exists, compare the validity time with duration of the timer; and a transmitter 63, configured to, if the validity time is greater than the duration of the timer, send the device trigger message to a user equipment UE after the timer times out.

The transmitter 63 is further configured to, if the validity time is not greater than the duration of the timer, send a message to the first device and/or discard the device trigger message, where the message is used to indicate that triggering is rejected, or transmission fails, or device triggering fails.

Optionally, the core network device is a short message service-service center SMS-SC.

The receiver 61 is further configured to receive the device trigger message that is sent by a machine type communications interworking device MTC-IWF and is from a service capability server SCS.

Optionally in parallel, the core network device is a serving node.

The receiver 61 is further configured to receive the device trigger message that is sent by an SMS-SC and is from the SCS, where the device trigger message is sent by the SCS to the SMS-SC by using an MTC-IWF, and is then sent by the SMS-SC to the serving node.

Optionally in parallel, the receiver 61 is further configured to receive the device trigger message that is sent by an MTC-IWF and is from the SCS.

Optionally in parallel, the core network device is an MTC-IWF.

The receiver 61 is further configured to receive the device trigger message sent by the SCS.

Figure 7:
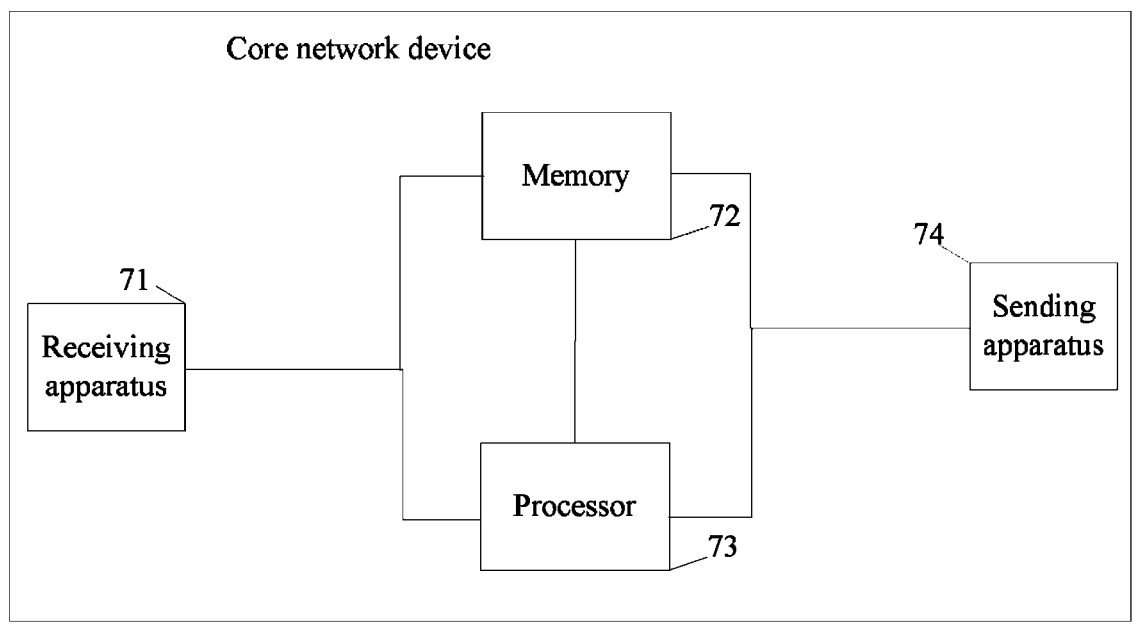
FIG. 7 is another schematic structural diagram of a core network device for transmitting a device trigger message according to an embodiment of the present invention.

According to still another aspect, as shown in FIG. 7, a core network device for transmitting a device trigger message is provided in an embodiment of the present invention, where the core network device includes:

a receiving apparatus 71, configured to receive a device trigger message sent by a first device, where the device trigger message includes information that indicates validity time of the device trigger message, where the first device includes an SCS or an MTC-IWF;

a memory 72, configured to store the device trigger message that is sent by the first device and received by the receiving apparatus 71;

a processor 73, configured to, when it is determined that a timer exists, extract the information that indicates the validity time of the device trigger message from the memory 72, and compare the validity time with duration of the timer; and a sending apparatus 74, configured to, if the validity time is greater than the duration of the timer, send the device trigger message to a user equipment UE after the timer times out.

The sending apparatus 74 is further configured to, if the validity time is not greater than the duration of the timer, send a message to the first device and/or discard the device trigger message, where the message is used to indicate that triggering is rejected, or transmission fails, or device triggering fails.

Optionally, the core network device includes a short message service-service center SMS-SC.

The receiving apparatus 71 is further configured to receive the device trigger message that is sent by the machine type communications interworking device MTC-IWF and is from the service capability server SCS.

Optionally in parallel, the core network device includes a serving node.

The receiving apparatus 71 is further configured to receive the device trigger message that is sent by an SMS- SC and is from the SCS, where the device trigger message is sent by the SCS to the SMS-SC by using the MTC-IWF, and is then sent by the SMS-SC to the serving node.

Optionally in parallel, the receiving apparatus 71 is further configured to receive the device trigger message that is sent by the MTC-IWF and is from the SCS.

Optionally in parallel, the core network device includes the MTC-IWF.

The receiving apparatus 71 is further configured to receive the device trigger message sent by the SCS.

Each part of the embodiments in this specification is described in a progressive manner. For same or similar parts of the embodiments, mutual reference to each other may be made. In particular, for the part of the embodiments that describes the system/device, as it is fundamentally similar to the part of the embodiments that describes the method, its description is relatively simple, and for a relevant part, reference may be made to the same or similar parts of the embodiments.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting a device trigger message, comprising:
    receiving a device trigger message sent by a first device, wherein the device trigger message comprises information that indicates a validity time for which the device trigger message is valid;
    when a timer exists, comparing the validity time with duration of the timer;
    if the validity time is greater than the duration of the timer, sending the device trigger message to a user equipment UE after the timer times out; and
    if the validity time is not greater than the duration of the timer, sending a message to the first device and/or discarding the device trigger message, wherein the message is used to indicate that triggering is rejected, or transmission fails, or device triggering fails.

2. The method according to claim 1, wherein the receiving a device trigger message sent by a first device comprises:
    receiving, by a short message service-service center SMS-SC, the device trigger message that is sent by a machine type communications interworking device (MTC-IWF) and is from a service capability server (SCS).

3. The method according to claim 1, wherein the comparing the validity time with duration of the timer comprises:
    comparing, by a short message service-service center SMS-SC, the validity time with the duration of the timer.

4. The method according to claim 1, wherein the receiving a device trigger message sent by a first device comprises:
    receiving, by a serving node, the device trigger message that is sent by an (SMS-SC) and is from the SCS, wherein the device trigger message is sent by the SCS to the SMS-SC by using an MTC-IWF, and is then sent by the SMS-SC to the serving node.

5. The method according to claim 1, wherein the comparing the validity time with duration of the timer comprises:
    comparing, by the serving node, the validity time with the duration of the timer.

6. The method according to claim 1, wherein the receiving a device trigger message sent by a first device comprises:
    receiving, by an MTC-IWF, the device trigger message sent by a service capability server (SCS).

7. The method according to claim 1, wherein the comparing the validity time with duration of the timer comprises:
    comparing, by a machine type communications interworking device (MTC-IWF), the validity time with the duration of the timer.

8. The method according to claim 6, wherein the comparing the validity time with duration of the timer comprises:
    comparing, by the MTC-IWF, the validity time with the duration of the timer.

9. The method according to claim 1, wherein the receiving a device trigger message sent by a first device comprises:
    receiving, by a serving node, the device trigger message that is sent by an MTC-IWF and is from a service capability server (SCS).

10. The method according to claim 1, wherein the first device comprises a service capability server (SCS) or a machine type communications interworking device (MTC-IWF).

11. A core network device for transmitting a device trigger message, comprising:
    a receiver, configured to receive a device trigger message sent by a first device, wherein the device trigger message comprises information that indicates a validity time for which the device trigger message is valid;
    a processor, configured to, when a timer exists, compare the validity time with duration of the timer; and
    a transmitter, configured to, if the validity time is greater than the duration of the timer, send the device trigger message to a user equipment UE after the timer times out, wherein
    the transmitter is further configured to, if the validity time is not greater than the duration of the timer, send a message to the first device and/or discard the device trigger message, wherein the message is used to indicate that triggering is rejected, or transmission fails, or device triggering fails.

12. The core network device according to claim 11, wherein the core network device is a short message service-service center (SMS-SC), and the receiver is further configured to receive the device trigger message that is sent by a machine type communications interworking device (MTC-IWF) and is from a service capability server (SCS).

13. The core network device according to claim 11, the core network device is a serving node, and the receiver is further configured to receive the device trigger message that is sent by a short message service-service center (SMS-SC) and is from a service capability server (SCS), where the device trigger message is sent by the SCS to the SMS-SC by using an MTC-IWF, and is then sent by the SMS-SC to the serving node;

the receiver is further configured to receive the device trigger message that is sent by the MTC-IWF and is from the SCS.

14. The core network device according to claim 11, wherein the core network device is an MTC-IWF, and the receiver is further configured to receive the device trigger message sent by a service capability server (SCS).

* * * * *